United States Patent [19]
Garland et al.

[11] Patent Number: 5,452,343
[45] Date of Patent: Sep. 19, 1995

[54] TELEMETRY ACCESS ARRANGEMENT

[75] Inventors: Stuart M. Garland, Morton Grove, Ill.; Jerome W. Schull, Marietta, Ga.

[73] Assignee: AT&T Corp., Murray Hill, N.J.

[21] Appl. No.: 266,831

[22] Filed: Jun. 28, 1994

[51] Int. Cl.6 .......................................... H04M 11/00
[52] U.S. Cl. ..................................... 379/106; 379/107
[58] Field of Search .................... 379/92, 102, 104–107

[56] References Cited

U.S. PATENT DOCUMENTS 5,189,694  2/1993  Garland .............................. 379/106

OTHER PUBLICATIONS

IEEE Standard for Utility Telemetry Service Architecture For Switched Telephone Network Communications, IEEEPI390/DI/May 1994, pp. 1–22, & FIGS. 1–9 attached.

*Primary Examiner*—Wing F. Chan
*Attorney, Agent, or Firm*—Werner Ulrich; Mony R. Ghose

[57]  ABSTRACT

This invention relates to a method and apparatus for accessing customer meters and for controlling customer devices over a telephone line. A connection using only a single distinctive brief burst of power ringing or tone is established over a customer line between a central office and customer station equipment to alert both the customer and the customer premises equipment (CPE) or a short burst of tone to alert the CPE. The connection is between a data accessing device such as a meter reading controller and a customer premises device such as a meter interface unit. Signals are exchanged over the connection between these two units without alerting the customer via a ringing signal and without changing the supervisory state of the customer's station equipment from on-hook. The connection can also be used for controlling devices such as air conditioning units, in order, for example, to avoid overloads in a power distribution system. The voice switching network of the central office is used for making the connection between the meter control unit and the meter interface unit. Advantageously, this arrangement can allow a large number of utility meters and controlling devices to be accessed remotely using existing telephone plant. The short distinctive burst of power ringing or tone alert may be used to alert the customer premises equipment (CPE), the customer telephone, or both.

11 Claims, 6 Drawing Sheets

TELEMETRY ACCESS ARRANGEMENT

TECHNICAL FIELD

This invention relates to a method and apparatus for accessing customer meters and for controlling customer devices over a telecommunications line.

PROBLEM

There has long been a need for reading utility meters periodically, a need which in the past has been met largely through manual arrangements. More recently, there has also been a growing desire by the electric power utilities to be able to control consumer electric loads as a means of forestalling brownout and blackout situations. This need has been met with only partial success in the prior art by telemetering arrangements associated with telephone customer line access and by the use of carder systems connected to power distribution lines. In these arrangements, utility meters at a telephone customer's home or business are accessed via the telephone customer's line when that line is not being used for telephone calls. The method of accessing the line is to have a direct metallic path between the customer's meter reading interface and a service unit at the central office for monitoring and controlling the off-hook/on-hook supervisory state of the customer. Access from the central office switch to the customer is provided through the use of a no-test trunk, i.e., a trunk which can access a customer's line even when that line is already in the off-hook state. The trunk uses a no-test connection, i.e., a special metallic connection that bypasses the normal switched telephone connection and connects without making a busy test. This metallic connection passes direct current signal. The no-test trunk is used to get access to the meters without ringing the customer's line, the latter action being performed on all conventional telephone connections. The meter is then triggered to respond by being sent signals over the no-test connection, each signal consisting of a burst of tone of one of thirteen frequencies in the telephone voice band. Using this arrangement, a connection is established to the customer's line, the service unit makes a test whether the customer is busy, and, if the customer is not busy, the service unit is connected to the customer's meter interface. The meter interface is primed (alerted) by one of the thirteen frequencies to respond to data signals originating from the service unit or a controller at the utility, transmitted via the service unit. These data signals may be either in the form of dual tone multifrequency (DTMF) signals or frequency shift keyed binary data signals. Following the alerting of the meter interface unit, there is an exchange of signaling information between the controller and the meter interface unit, the signaling exchange being used for triggering the reading of meters, for transmitting the present reading of the meters, for returning the present status of these meters, or for controlling a device such as an air conditioner at the called customer's residential or business location. The latter function allows a power company to control its peak load by temporarily shutting down, possibly on a rotating basis, a portion of the air conditioners being served. The actual reading of the meters is performed by a reading mechanism that interfaces with the meter interface used. Meter status information includes indications of customer tampering, low battery, or other indications of a need for servicing. After a complete cycle of meter readings and/or device control operations has been completed, the no-test connection is dropped and the customer is enabled to originate new calls.

While the customer's line is connected to the service unit, supervision of the customer's line is performed by the central office service unit (C.O. service unit) which is connected by a metallic access connection that provides current sensing supervision from a central office service unit. In modern digital switching systems, such as the 5ESS® switch manufactured by AT&T, and described in *The AT&T Technical Journal*, July/August 1985, no metallic access connection is provided through the voice network, so that a no-test trunk is required for monitoring direct current supervisory signals. If the customer's telephone station goes off-hook, a direct current in excess of 20 milliamperes is detected by the C.O. service unit and the central office service unit disconnects the telemetry call. In some cases, the supervision is performed from the customer's meter interface unit which transmits a disconnect signal to the central office service unit to disconnect the telemetry call.

There are a number of disadvantages to this arrangement. The no-test trunk is a facility available in very small numbers in a central office, the number being limited by the no-test access arrangements. No-test trunks are used primarily for checking on customers whose lines are reported as being busy for too long a time, making tests of the resistance between the two wires of a customer line, and manual testing of a line. In a typical switch, such as the 5ESS switch, only two no-test trunks are available in an entire switch, which may serve up to several hundred thousand customer lines. In a typical meter reading cycle the time required for meter readings and/or device control operations may vary from 10 to 20 seconds. Clearly, two no-test trunks are inadequate to serve the meter reading and device control needs of all the customers of the 5ESS switch. Further, the requirement for a direct metallic path in order to provide current sensing supervision makes it difficult to access lines which are not connected directly to a switch but are connected through a subscriber line carrier system, such as the SLC 96 (Subscriber Line Carrier) manufactured by AT&T, since such SLC systems do not provide a metallic path for a normal voice connection. Further, billing records for such no-test trunk calls are made separately from the billing records for voice or data calls, thus creating administrative problems. Further, in prior art arrangements, if a customer wishes to originate a call while the meter reading is taking place, there are some arrangements in which the customer is blocked until the reading is completed and other arrangements in which the customer is blocked for a period of 1 to 2 seconds until the no-test connection can be dropped.

Because of the small number of no-test trunks and limited no-test access, and the fact that the no-test trunks are needed for their primary intended purposes, the number of meters which may be monitored and devices which may be controlled is much smaller than the number of such meters and devices served by a typical large local central office. It is costly to add substantial numbers of extra no-test trunks, in a digital switch such as the 5ESS switch which does not provide a metallic access voice switching network, because the metallic access unit provided for such no-test trunks is expensive. An arrangement in the prior art for accomplishing this goal is described in U.S. Pat. Nos.

5,189,694 and 5,243,644. A problem of this prior art arrangement is that it requires relatively expensive signal reception arrangements at the customer station to respond to the requests for meter reading or device control services.

SOLUTION

The above problem is solved, in a departure from the prior art by providing, for example, arrangements wherein a standard interoffice trunk, controllable by special software of the connected switching system, is used for accessing, over an analog customer line, a customer's premises device such as a meter interface unit (MIU) from a data access device, such as a utility meter reader/device controller; this standard trunk is then connectable to the customer's line via a connection through the communication signal switching network, used, for example, for voice signals, in order to access the customer's analog line, connected to the MIU, and applying only a brief spun of ringing instead of the conventional ringing signal or no ringing signal. The brief spun of power ringing or tone ringing distinctively notifies the customer or the customer premises equipment of a special purpose connection. The length of this brief spun is provided by a utility, for example, connected over the standard trunk through the use of specialized multifrequency signals (for example, selection of one of ST0, ST1, ST2, ST3) or the class of service of the trunk, or both. Advantageously, such an arrangement makes it possible to use a plurality of circuits for accessing different meter interface units or customers at the same time and without requiring additional expensive specialized no-test trunks.

Present-day subscriber line carders (SLCs) will not set up a connection unless they detect ringing. However, when a meter interface unit access call is set up through a subscriber line carrier, a brief burst of ringing is applied on that connection. In response to that brief burst of ringing, the subscriber line carrier sets up a connection within its own switch fabric to the called customer whose meter interface unit is being accessed. The burst of ringing is sufficiently short that the subscriber line carder which repeats any ringing signals that it detects on its input, will not in fact repeat any ringing signal to that customer's line, thus, avoiding disturbing the customer when only the meter interface unit is being accessed.

While the MIU is alerted in the on-hook state, signal transmission to the MIU can take place in the on-hook or the off-hook state. In the preferred mode, the off-hook state is used.

A central office service unit interfaces between a utility controller, such as a personal computer, at the utility and the meter interface unit connected through the voice signal switching network. Responsive to signals from the utility controller, the central office service unit signals the switch with the identification of the called customer to set up a suppressed ringing connection to the desired meter interface unit. The central office service unit or utility controller transmits alerting signals to the meter interface unit.

In the on-hook transmission case, the end user at station 36 goes off hook, switch 21 detects the end user off-hook condition, takes down the call and gives the central office service unit (COSU) 20 an on-hook signal. In response COSU 20 returns an on-hook signal to the switch 21. For an off-hook transmission MIU 30, the switch 21 cannot detect when end user station 36 goes off hook (because MIU 30 is already off hook); therefore MIU 30 and/or COSU 20 must detect the end user station 36 off hook. The MIU and the COSU detect a lower signal level and use this lower signal to initiate the disconnect procedure. For the latter disconnect procedure, COSU 20 goes on hook to the switch 21; switch 21 takes down the call and returns on hook to COSU 20; the switch 21 now returns dial tone to end user station 36. The central office service unit detects off-hook signals in the switch in order to signal for a premature disconnect, and responds to a meter interface unit disconnect signal to signal the switch for a disconnect of the meter reading and/or device control connection. The central office service unit has a plurality of interoffice trunks for communicating with customers connected to other switching systems and for communicating simultaneously for reading several meters in parallel for customers in these switching systems; it also is connectable to a plurality of utilities for simultaneous use over different trunks.

In accordance with one aspect of the invention, for an Integrated Services Digital Network (ISDN) station connected via a Primary Rate Interface or a Basic Rate Interface, and a digital line, the D-channel is used for communicating with the meters and controllable devices. This also permits the communication signal switching network to be used for providing access to the customer's lines and allows the high bandwidth (64 or 16 kb./sec.) D-channel to be utilized for communications with the meters and devices. Here, supervision is detected at the customer premises and is transmitted by data signals over the D-channel. The ISDN stations are responsive to the request for an abbreviated spurt of alerting to provide the time adjustable spurt.

Accordingly, this invention provides a method and apparatus for accessing customer premises devices from a data access device by using a suppressed ringing connection, featuring a special abbreviated burst of ringing, through a voice signal switching network of a telecommunications switching system.

DETAILED DESCRIPTION

Figure 1:
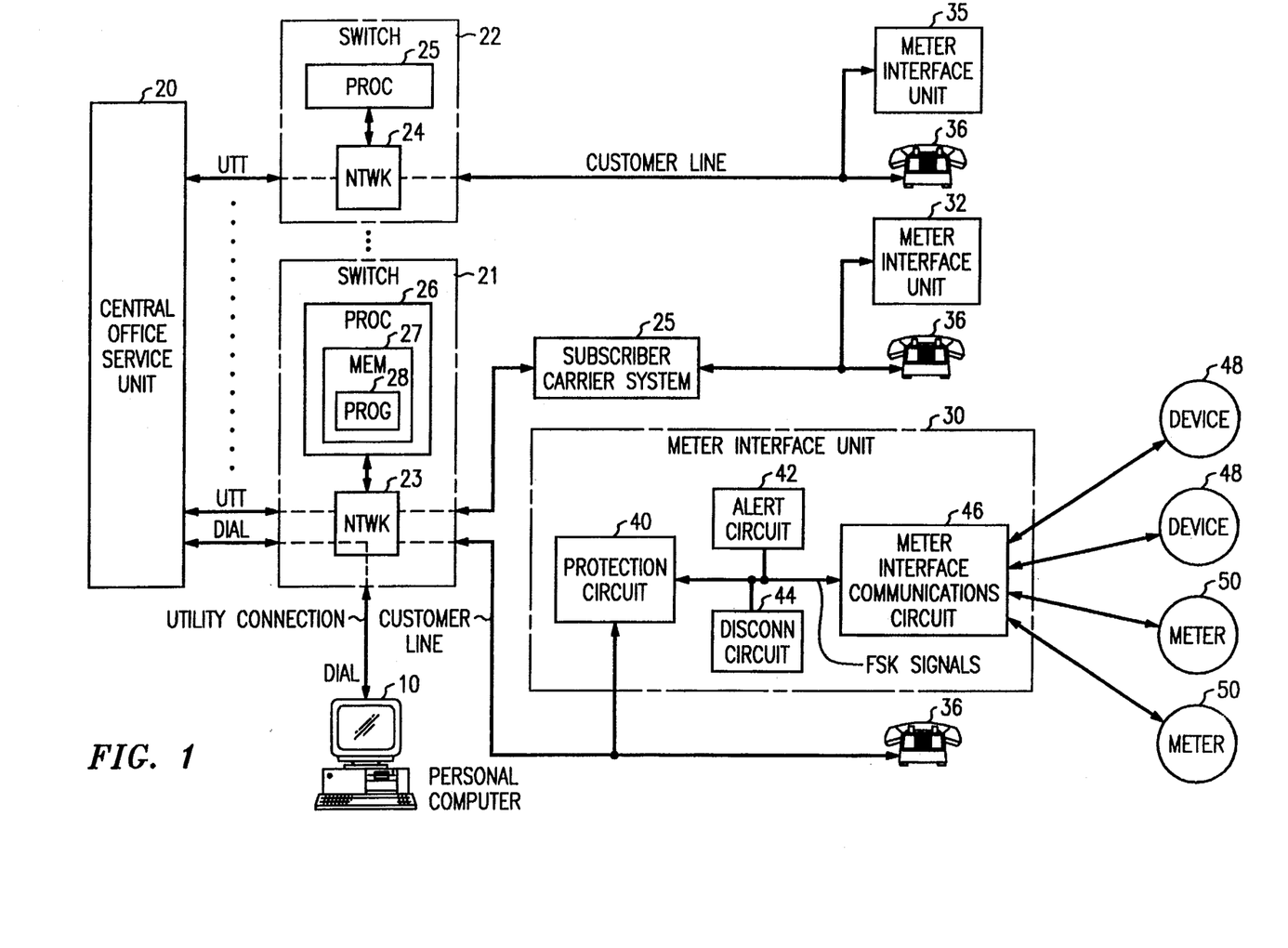
FIG. 1 is a block diagram illustrating connections for accessing customer meters and devices.

FIG. 1 is a block diagram of the operation of applicant's invention. A terminal such as a personal computer 10 at the office of a utility is connected by a line or connected over an interoffice trunk to a telephone switch 21. When an access number is dialed and received from PC 10 in switch 21, a connection is set up to a central office service unit 20. The central service unit is located herein in a first central office that includes switching system (switch) 21. In alternative arrangements, the central office service unit disconnects PC 10 and dials back to access PC 10 in order to guard against tampering of the meter reading and device control process from unauthorized sources. This central office (C.O.) service unit 20 is connected to a plurality of central office switches, such as switch 21 and 22 by utility telemetering trunks which are simple analog or digital interoffice trunks. Each of the switches 21 and 22, which may be housed in different wire centers, has a switching network, 23 and 24, respectively, for transmitting communications signals, such as voice signals, and including the meter reading and device control signals of this invention. Each of the switches comprises control processor means 26, operative under the control of a program 28, stored in memory 27 for controlling the operations of the switch. In response to signals received from PC 10, C.O. service unit 20 requests utility connections by sending signals similar to the kinds of signals sent for setting up an interoffice call to the appropriate one of switches 21 or 22.

In this specific embodiment, the method used for signaling, from a central office service unit (COSU) 20 via a utility telemetry trunk (UTT), the request to be connected via a customer line to a particular metering interface unit (MIU) such as MIU 30, MIU 32 or MIU 35, is to send out a string of multifrequency (MF) digits. The MIU is connected in parallel with a customer telephone 36. Such a string of digits usually consists of a key pulse signal (KP), a string of digits to identify the caller (Automatic Number Identification (ANI)), and a start (ST) signal followed by a second KP, a four, five, seven or ten digit directory number and a second ST signal. In response to reception of the latter digits, a switch, such as switch 21, translates the received directory number to identify a meter interface unit, such as meter interface unit 30, and sets up a connection via UTT between the central office service unit 20 through a switching network 23 or 24 via a customer line to a MIU 30, 32 or 35.

The utility telemetry trunk has a special class of service which identifies to the connected switch that the requested connection is to be made with normal ringing suppressed and without regard to features, such as call forwarding, which may be assigned to the line but which must be suppressed for this special connection. In response to a received directory number from a UTT, switch 21 sets up a connection with ringing suppressed to MIU 30. Note that a suppressed ringing connection differs from a conventional voice connection, not only in that a normal ringing signal is not sent and that the line is not monitored for a supervisory signal to stop or "trip" ringing, but that no check is made that a ringing signal is actually flowing to the analog line.

In the preferred off-hook transmission mode, used with the distinctive burst of ringing of the present invention, the terminating line goes off hook, and for the duration of the special connection, the customer cannot initiate an outgoing call. For an off-hook transmission MIU 30, the switch 21 cannot detect when end user station 36 goes off hook (because MIU 30 is already off hook); therefore MIU 30 and/or COSU 20 must detect the end user station 36 off hook. The MIU and the COSU detect a lower signal level and use this lower signal to initiate the disconnect procedure. For the latter disconnect procedure, COSU 20 goes on hook to the switch 21; switch 21 takes down the call and returns on hook to COSU 20; the switch 21 now returns dial tone to end user station 36. The off-hook signal from the terminating line also is a signal to allow the special ringing signal to be disconnected. The normal ringing signal and its accompanying checks are a basic and inherent part of any normal telephone connection. For example, even when a facsimile call is completed, wherein no audible bell is heard, the circuits of the terminating facsimile machine respond to the ringing signal that is sent from the switch. For some applications it is desirable that instead of completely suppressing the ringing, a distinctive signal, such as a short initial burst of ringing, be allowed to pass through. Note that such a short initial burst of ringing is different from a distinctive, ringing repetitive pattern. The length of this short initial burst should be adjustable for different applications so that the customer premises equipment or the customer can recognize which of a number of durations of short ringing signals is being received, each different duration, for example, being for a different purpose.

In the memory 28 of the switch, the duration of the burst of ringing is specified, in the same way as it is specified for abbreviated ringing to access a customer via a SLC. When the abbreviated burst of ringing goes to a SLC, it is used for establishing the connection through the SLC. When the abbreviated burst of ringing goes directly to the end customer, the abbreviated burst is interpreted by the meter interface unit or other CPE attached to the line as a specific request to access or control a device, or to alert the end user in a distinctive manner. One of the applications of the distinctive burst of ringing is to trigger a special alerting device, such as a loud gong, to alert the customer.

If the customer being accessed is connected through a SLC, the duration of the abbreviated burst of ringing is made long enough to be able to both establish the connection through the SLC and still transmit an appropriate duration abbreviated burst of ringing to the end customer on the CPE of that customer, or an initial burst is sent to connect the SLC, and this is followed by the distinctive burst of ringing.

When the suppressed ringing connection, featuring the abbreviated ring of the present invention, to the MIU has been established, MIU 30 is connected to C.O. service unit 20 and receives from that service unit or from PC 10 through the service unit an alert tone to trigger the MIU into the telemetry mode. In accordance with the principles of this invention, wherein a customer's station equipment includes both a voice or other communication station and an MIU, the normal ringing signal alerts the communication station, and, where this is a voice station, thereby alerts the customer, while the tone signal sent over the suppressed ringing connection alerts the MIU. For the case of the special burst of ringing, this burst may alert the customer as well as the MIU, of a special condition. Different lengths of abbreviated ringing signals can activate different customer premises equipment (CPE) devices. Telemetry and control signals are then exchanged between C.O. service unit 20 or utility controller 10 and MIU 30 and the data received from MIU 30 is transmitted from C.O. service unit 20 to PC 10 for processing by the utility. Similarly, utility control signals are sent from PC 10 to C.O. service unit 20 for transmission to MIU 30 to control devices at the customer's home. If a customer picks up the handset of a telephone station while the communication between the service unit and the meters and/or devices at the customer's location is in progress, these communications are quickly terminated and regular service restored to the customer. An incoming call, however, will receive a busy signal if a utility access call is in progress.

The UTT is a conventional interoffice trunk such as an E & M analog or digital trunk or a common channel signaling trunk. Such trunks have arrangements whereby a change of supervision at one end is signaled to the other end by a tone (E & M) or by an out of band tone or data signal. Such a trunk passes a supervisory signal, detected at a line circuit and passed by the switch processor to one end of the trunk, to the C.O. service unit to effect a disconnect of that unit when a customer goes off hook in the middle of a utility access call.

The C.O. service unit is expanded from prior art C.O. service units to be connected by trunks to a plurality of switches, such as switch 21, . . . , 22, and is connectable by a plurality of trunks (a trunk group) to each such switch. In some cases, several trunk groups, each group capable of being assigned different groups of three abbreviated ringing durations may be connected to one switch, for example, to handle traffic to different groups of SLCs. The C.O. service unit is also connected to a plurality of utilities, only one of which is shown, which simultaneously establish calls to different customers.

While in this embodiment, the utility access unit PC 10 is connected to the MIU through a service unit, an alternate configuration would permit a utility access unit to be connected via a trunk directly to the switching network for connection to the MIU.

The specific embodiment of FIG. 1 uses an analog line, transmitting voice band signals, ringing or tone alerting signals, and using direct current detection of supervision in the switch. The term "ringing" as used herein is used for convenience and because of its common use, but is meant to describe any process of customer alerting, including, for example customer tone alerting. For Integrated Services Digital Network (ISDN) lines, supervision and customer alerting signals are transmitted as data signals over the D-channel of the customer line, but still need a COSU and the special class of service of the UTT. The ISDN stations are responsive to the request for an abbreviated spurt of alerting to provide the time adjustable spurt.

FIG. 1 shows details of a meter interface unit. A protection circuit 40 is used to protect the rest of the meter interface unit 30 against damage caused by electrical signals carrying excessively high energy. Effectively, this is over-voltage protection. Such protection circuits are well known in the prior art. Alert circuit 42 is used to detect the initial alerting tones used for signaling a request for a connection to the meter interface communication circuit (MICC) 46. The alert circuit continuously monitors the line when the line is on-hook in order to detect such signals. When such signals are detected, it activates the meter interface communication circuit which communicates with PC 10 to exchange the reading information from meters and the control information on meters 50 and the control information for controlling devices 48. When a control and/or reading cycle has been completed as determined by the C.O. service unit 20, the C.O. service unit goes on-hook which triggers switch 21 to send an 800 millisecond minimum open loop signal to the MIU to signal a disconnect.

In the preferred embodiment, the MICC 46 goes off-hook when the alerting signal is detected. The switch 21 detects the off-hook and sends an off-hook signal to the COSU 20 which then removes alerting tones. For an off-hook transmission MIU 30, the switch 21 cannot detect when end user station 36 goes off hook (because MIU 30 is already off hook); therefore MIU 30 and/or COSU 20 must detect the end user station 36 off hook. The MIU and the COSU detect a lower signal level and use this lower signal to initiate the disconnect procedure. For the latter disconnect procedure, COSU 20 goes on hook to the switch 21; switch 21 takes down the call and returns on hook to COSU 20; the switch 21 now returns dial tone to end user station 36. In an alternate embodiment, not the preferred embodiment, the MICC 46 remains on-hook during the telemetry call; in that case, if the customer at subscriber station 36 goes off-hook during the telemetry call, the telemetry call is immediately disconnected and dial tone is returned to the customer. The second embodiment has the disadvantage that it is contrary to FCC regulations when sending information from the CPE to the switch (which require all connections to be off hook connections when sending information from the CPE to the switch).

In some cases, certain SLCs such as AT&T's SLC 96 will not transmit a forward disconnect (open). In many cases it will. It depends on the channel units installed. If the disconnect is not forwarded, then the MIU detects the end of data transmission and notifies the C.O. service unit during the data transmission, and the C.O. service unit detects the end of data transmission and disconnects to connecting trunk.

As long as the meter interface unit 30 presents an impedance in excess of approximately 10 k ohms to the line, the central office will treat the line as being on-hook. If the customer should pick up his telephone instrument while the communication between the PC and the meter interface unit is going on, switch 21 will detect the off-hook and cause the communication between the PC and the meter interface unit to be aborted by sending a disconnect signal to the MIU and an on-hook signal to the C.O. service unit to terminate the connection.

Arrangements for communicating with the alternate embodiment on-hook devices such as an on-hook transmission meter interface unit are well known in the prior art and are defined, for example, in *Bellcore Technical Reference TR-TSY-000030*, Issue 1, June, 1988.

Figure 2:
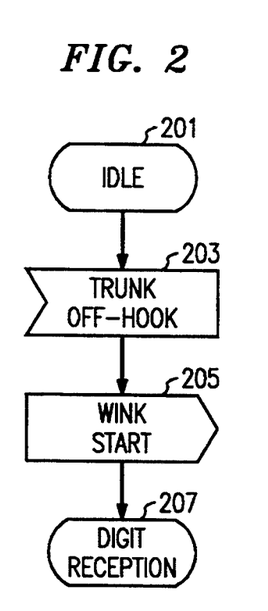
FIGS. 2-6 are flowcharts of actions performed in setting up such connections and in accessing meters and devices.

FIGS. 2–6 are flow charts showing the call processing actions that take place while processing a utility telemetry call. FIG. 2 shows the first steps in response to a seizure from a utility telemetry trunk. As shown in FIG. 1, utility telemetry trunks, which are ordinary interoffice trunks, are connectable to different switches. The trunk is originally in the idle state. The COSU goes off-hook (action block 203) and a wink start signal is received from the trunk (action block 205). According to the convention used in the diagrams of this disclosure, a block having an indentation on the left such as block 203 is a block in which information is sent from equipment outside the switch (customer premises equipment or the COSU) to the switch, a block having an external protrusion on the right such as block 205 is one which indicates that information is being transmitted from the switch to an external unit, and a block such as block 631 (FIG. 6) with a double line on the right indicates a situation wherein the switch generates the information internally. This is followed by the digit reception state (action block 207).

Figure 3:
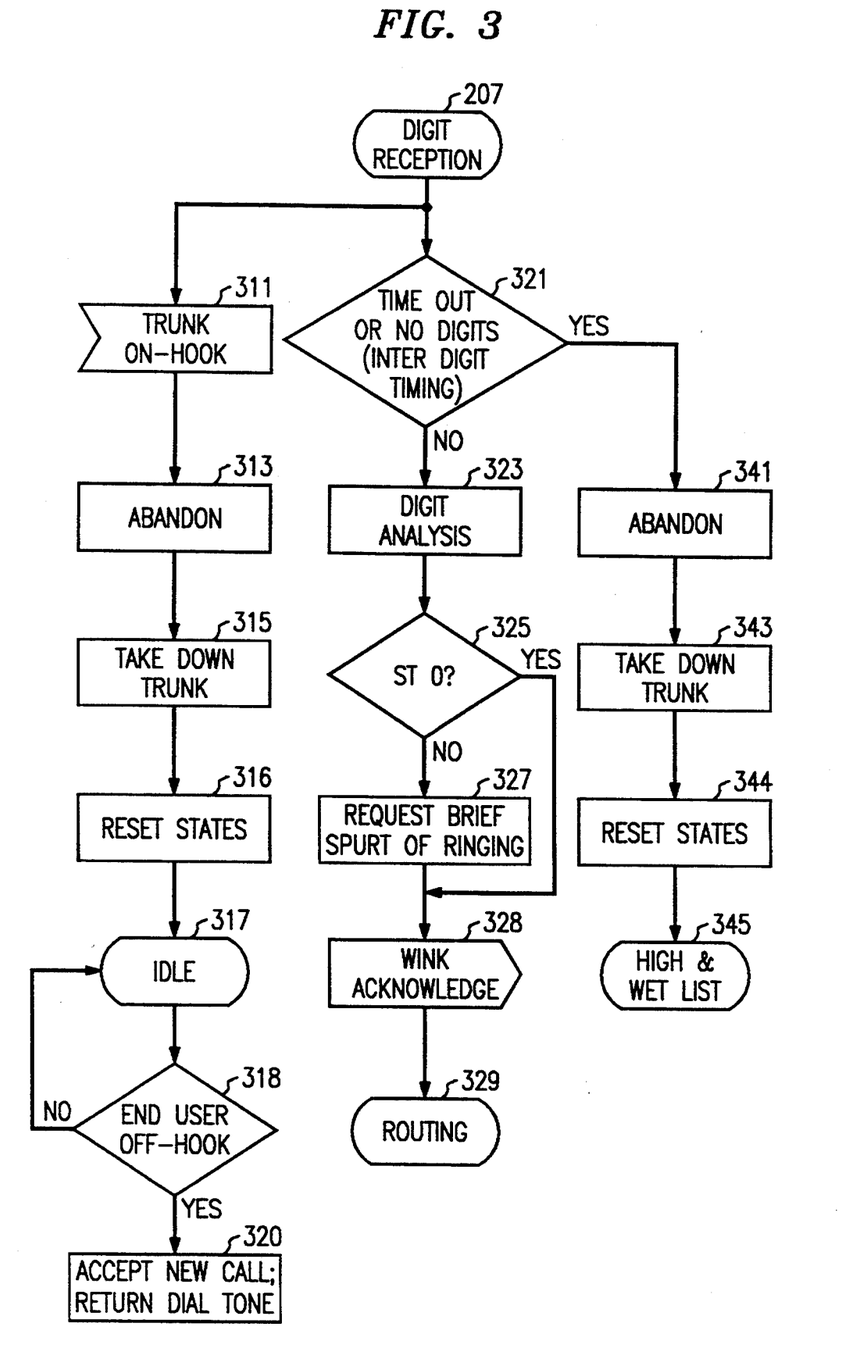

FIG. 3 is a flow chart in response to digit reception. If the trunk goes on-hook during or following digit reception (action block 311), the call is considered abandoned (action block 313) and the trunk is taken down (action block 315), the states of the two ends of the COSU to customer connection are monitored until both are on-hook (action block 316) and then the trunk is restored to the idle state (action block 317). From the idle state, if the end user is detected as off-hook (test 318), the switch prepares to accept a new call and returns dial tone (action block 320). If there is a timeout or no digits are received as determined by the tests in the interdigit timing (test 321), then the call is considered abandoned (action block 341), the trunk is taken down (action block 343), the states of the two ends of the COSU to customer connection are monitored until both are on-hook (action block 316) and then the trunk is restored to the idle state (344) and the trunk is placed on a "high and wet" list, i.e., a list of inaccessible off-hook trunks (action block 345). If the digits are properly received, the digits are analyzed (action block 323). If the ST signal is the standard ST signal (ST0) as determined in test 325, a wink acknowledge is received (block 328), and the routing sequence 329 is entered. Otherwise, the type of alternate ST signal (ST1, ST2, or ST3) is used to determine the length of a requested burst of ringing and this burst of ringing is requested for application after a cut through connection has been set up to the requested meter interface unit. The cut through connection is made by the switch. The path may or may not be available due to the SLC being in the circuit. Therefore the "connection" has not been "set up." The switch considers it set up but the loop elements (DLC) might not allow it. That is the purpose of the abbreviated ring pulse (set up the path). In this specific example, the length of the bursts are 20, 40 and 60 ms.; further experimentation may indicate that other lengths, such as 50, 100 and 150 ms. may be preferable to take into account, for example, variations in the ability to control the length of a burst. Each trunk group can have four different times, corresponding to the four different ST signals. The best arrangement is to permit the length of the burst to be a parameter controllable by the translation recent change facility of modem switches. If more than 3 different lengths (plus 0 length) are required, different groups of utility trunks are used for different groups of ringing burst lengths; for example, group A could be used for 0, 20, 40 or 60 ms. bursts, while group B could be used for 0, 80, 100 and 120 ms. bursts. The burst of ringing is used in the SLC to assign a time slot for the connection to the customer's MIU, but is sufficiently short that it is not replicated on the line side; thus, no ringing signal is sent to the MIU. Thereafter, a wink acknowledge is received (block 328) and the routing sequence 329 is performed.

Figure 4:
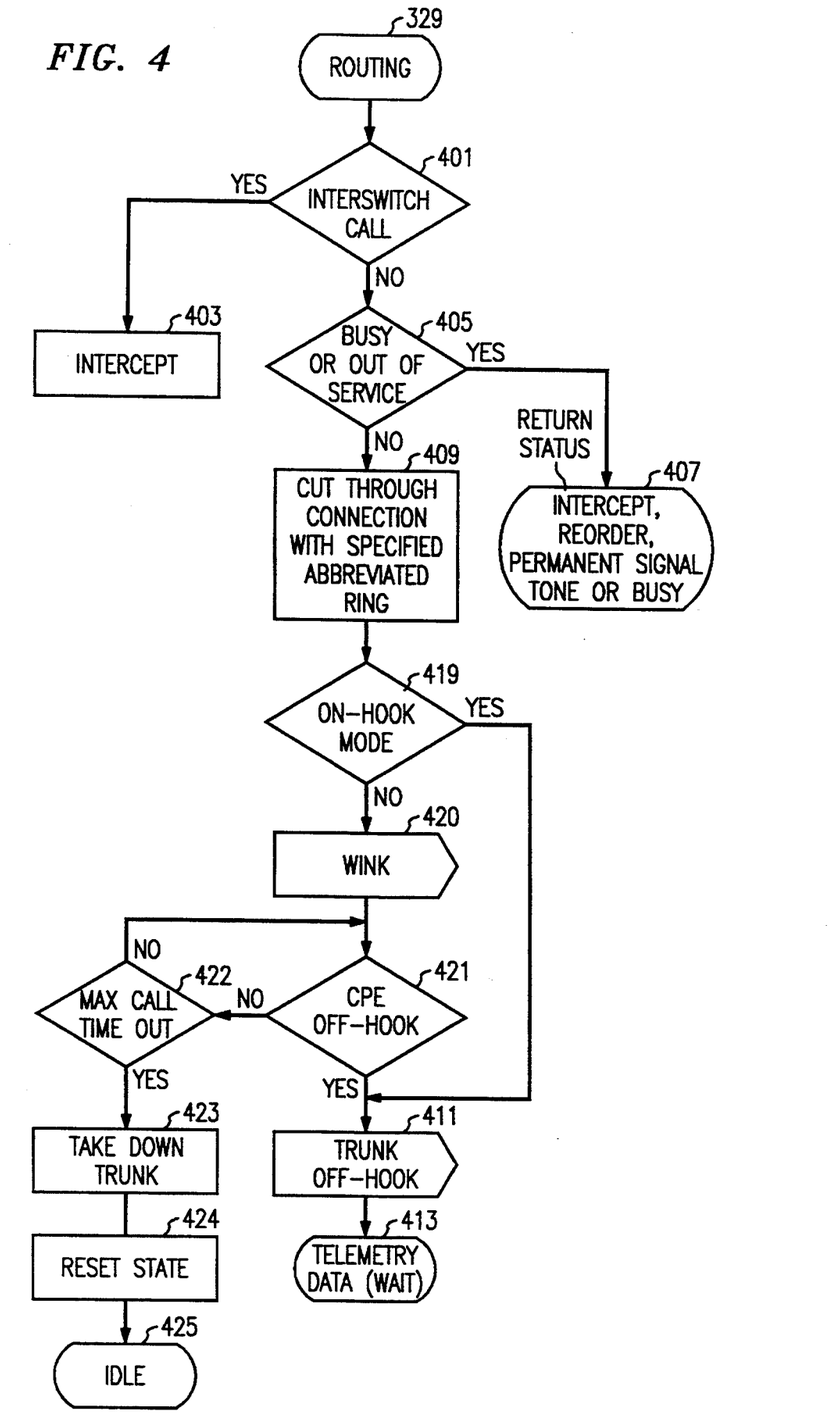

FIG. 4 is a flow diagram of the steps of the routing sequence 329. First, a determination is made by test 401 whether the call is an interswitch call. If so, this indicates an intercept connection 403 is required since the utility telemetry trunk used on the call is supposed to be connected to the switch serving the requested meter interface unit. If this is not an interswitch call, then test 405 determines whether the called customer line associated with the requested meter interface unit has a condition which requires a Busy, Intercept, Reorder, or Permanent Signal tone response. If so, then the specified response is returned to the trunk control program (state 407) and further actions are performed as described in FIG. 5. If the called customer line is available then the connection is cut through with the abbreviated ring if necessary as specified in block 327 (action block 409). If the on-hook transmission mode is used, then block 411, described below is entered. A wink signal is received from the switch (block 420) and test 421 determines whether the customer premises equipment is off-hook. If not, test 422 determines whether there has been a timeout. If not, test 421 is repeated. If there has been a timeout then the trunk is taken down (reset) and its state in the switch is reset, the trunk is taken down (action block 423, the states of the line and trunk are restored (action block 424) and the trunk is restored to idle (state 424). For off-hook transmission, the switch waits for an off-hook signal from the CPE on the connected line. If the customer premises equipment is determined to be off-hook in test 421, the call is considered to be cut through. When the call is cut through to the end user, a trunk off-hook signal is returned to the C.O. service unit 20 (action block 411). When off-hook data transmission is implemented, a wink is returned to the COSU indicating that cut-through has occurred. When the CPE goes off hook the UTT goes off hook to the COSU. The trunk then goes into the telemetry data wait state (413).

Figure 5:
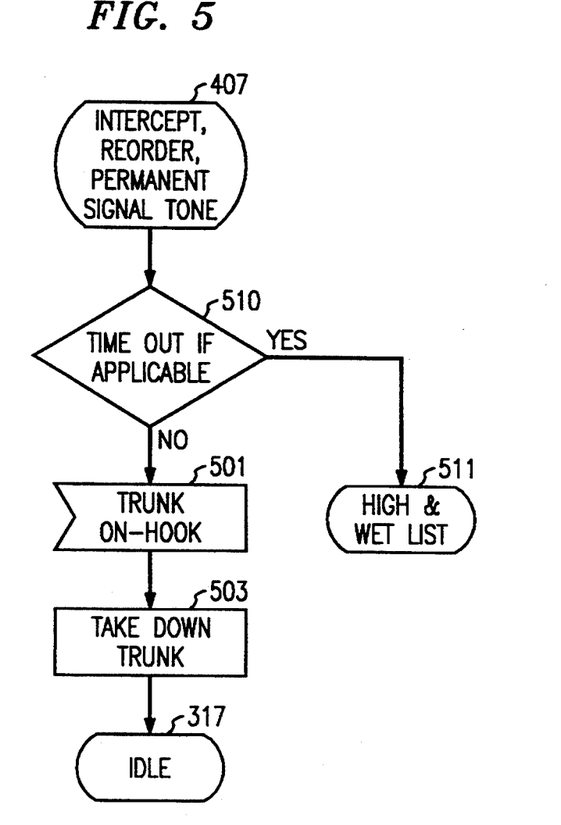

FIG. 5 describes the actions performed by the return status (state 407) previously described. If there has been a time out (test 510), the trunk is placed on a "high and wet" list (state 511). If there has been no timeout, an on-hook signal is sent over the utility telemetering trunk to the C.O. service unit 20 (action block 501) and the trunk is taken down and reset (action block 503). The trunk is then in the idle state (317).

In the telemetry data wait state, it is the responsibility of the C.O. service unit, responsive to signals from the utility controller or internally triggered, to alert the MIU. Using today's equipment, the MIU is alerted by one of 13 single frequencies. Once the MIU has been alerted, other signals such as frequency shift keyed data signals can be used for communicating with the MIU. The end user cannot alert the MIU because the user's station equipment does not have a one-of-13 single frequency generator and, further, the call would be taken down if the end user went off hook.

Figure 6:
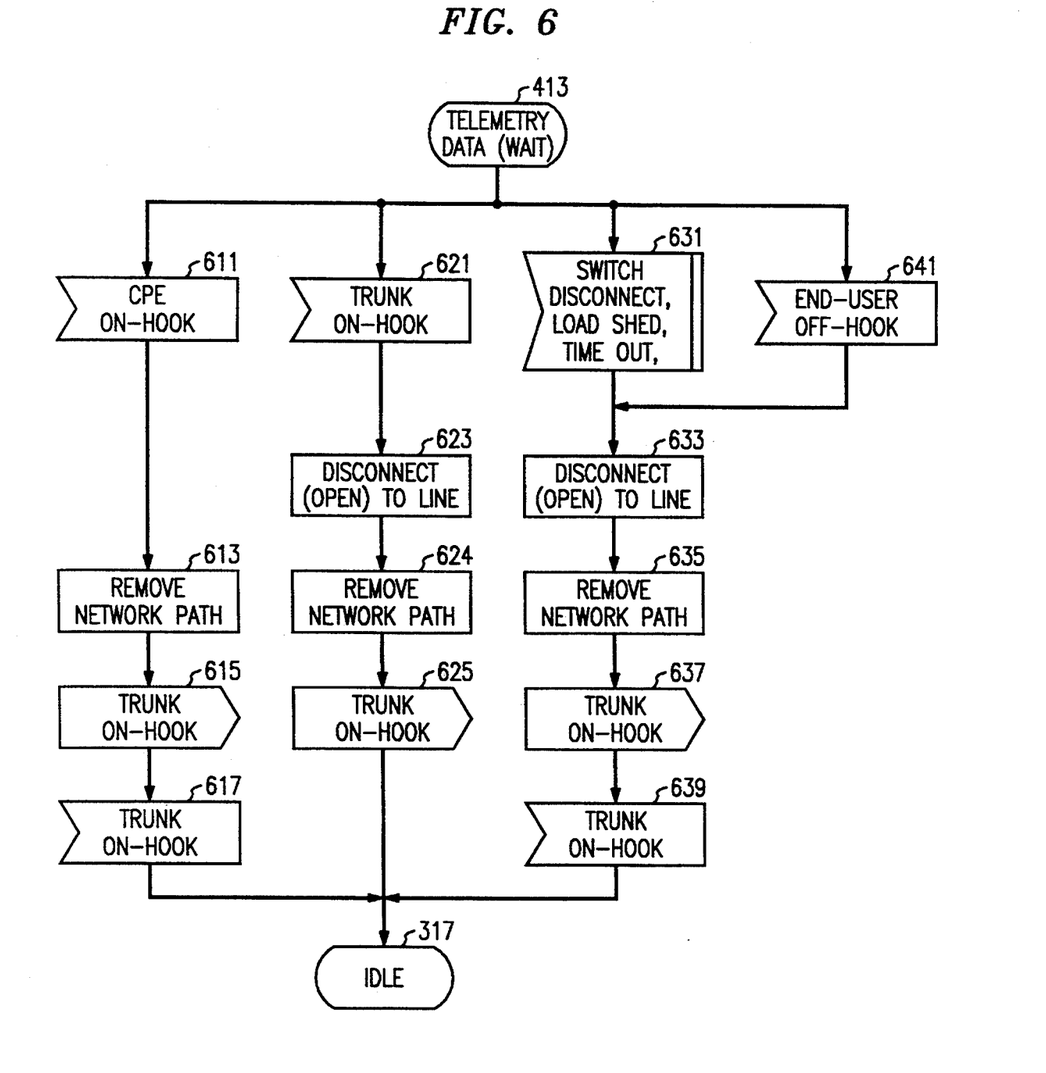

FIG. 6 is a flow diagram of the actions performed in response to various timeout conditions and in response to disconnect signals. The switch is in a wait state (413) during the telemetry connection. The same disconnect functions are performed upon completion of a telemetry access call as are performed when a voice call disconnects. A billing record is made in the same way as a billing record is made for a conventional (voice) call. If the customer premises equipment goes on-hook (action block 611) then the network path is removed (action block 613) and the switch transmits an on-hook signal to the trunk (action block 615). In response the trunk returns its on-hook signal to the switch (action block 617) and the switch restores the customer line to idle (block 317).

If an on-hook signal is detected on the utility telemetry trunk (UTT), indicating a disconnect from the COSU side (action block 621), then the line connected to the metering interface unit is disconnected (action block 623), the network path is removed (action block 624), the utility telemetering trunk is sent an on-hook signal by the switch, (action block 625), and the customer line is restored to idle (317). If timeout, switch disconnect, or load shedding state is detected or generated in the switch, indicating that telemetry activities should be suspended (action block 631), or if the end user goes off hook in an on hook telemetering transmission mode MIU, then action blocks 633 (similar to 623), 635 (similar to 625), and 637 (similar to 627) are performed, followed by the reception of the on-hook signal from the trunk (action block 639). (The double line at the right of action block 631 indicates that the switch generates the information internally.) The line is then restored to idle (block 317), whereafter, a new call request can be detected and served (blocks 318, 320).

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of accessing a customer premises device from data accessing device via a telecommunications switching system, said telecommunications switching system comprising a voice band signal switching network for switchably interconnecting multiplicities of inlets and multiplicities of outlets, said inlets for connection to interoffice telecommunications trunks, said outlets for connection to analog customer lines, the method comprising:

determining that a class of service for an inlet connected to said data accessing device is a class of service requiring transmission of a distinctive burst of signal for alerting connected customer premises equipment (CPE);

establishing a connection from said inlet to an outlet of said voice band signal switching network for connecting said data accessing device to an analog customer line connected to CPE of said customer;

alerting CPE of said customer of a requested customer premises device access with said distinctive burst of signal; and     transmitting, after the step of alerting, signals over said connection for accessing said customer premises device over said analog line from said data accessing device.

2. The method of claim 1 further comprising:

determining that station equipment of said customer is connected to said outlet via a subscriber loop carrier (SLC); and     responsive to said determination, transmitting an abbreviated burst of ringing to cause the SLC channel unit to assign a timeslot for communications to occur.

3. The method of claim 2 wherein said abbreviated burst of ringing is combined with said distinctive burst of signal to form one continuous ringing signal.

4. The method of claim 1 wherein a length of time of said distinctive burst of signal is specified by one of a plurality of ST multifrequency signals received from said inlet.

5. The method of claim 1 wherein determining the length of said distinctive burst comprises deriving translation data based on a received one of a plurality of ST multifrequency signals, for said inlet.

6. The method of claim 1 wherein said distinctive burst of signal comprises a burst of a power ringing signal.

7. The method of claim 6 wherein different distinctive bursts of a power ringing signal initiate different actions by said customer premises device.

8. The method of claim 6 wherein said distinctive burst of power ringing also serves to alert a customer served by said customer premises device.

9. The method of claim 1 wherein said distinctive burst of signal comprises a burst of tone signal.

10. The method of claim 9 wherein different bursts of tone signal initiate different actions according to a length of said burst or a frequency of said burst.

11. The method of claim 1 wherein said outlets further comprise outlets for connection to integrated services digital network (ISDN) customer lines, wherein the establishing step further comprises establishing a connection for connecting said data accessing device to an ISDN customer line for transmitting an ISDN alerting signal, corresponding to said distinctive brief burst of signal over a D-channel of the connection to said ISDN customer line.

* * * * *

UNITED STATES PATENT AND TRADEMARK OFFICE
CERTIFICATE OF CORRECTION

PATENT NO. : 5,452,343

DATED : September 19, 1995

INVENTOR(S) : Stuart M. Garland, Jerome W. Schull

It is certified that error appears in the above-identified patent and that said Letters Patent is hereby corrected as shown below:

Column 11, claim 1, line 6, after "from" insert --a--.

Signed and Sealed this

Sixth Day of February, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,452,343
DATED : September 19, 1995
INVENTOR(S) : Stuart M. Garland, Jerome W. Schull It is certified that error appears in the above-indentified patent and that said Letters Patent is hereby corrected as shown below:

On the title page: Item [73] Assignee: after "AT&T Corp., Murray Hill, N. J." insert --BellSouth Corporation, Atlanta, Georgia --.

Signed and Sealed this

Twenty-fifth Day of June, 1996

*Attest:*

BRUCE LEHMAN

*Attesting Officer*    Commissioner of Patents and Trademarks